UNITED STATES PATENT OFFICE.

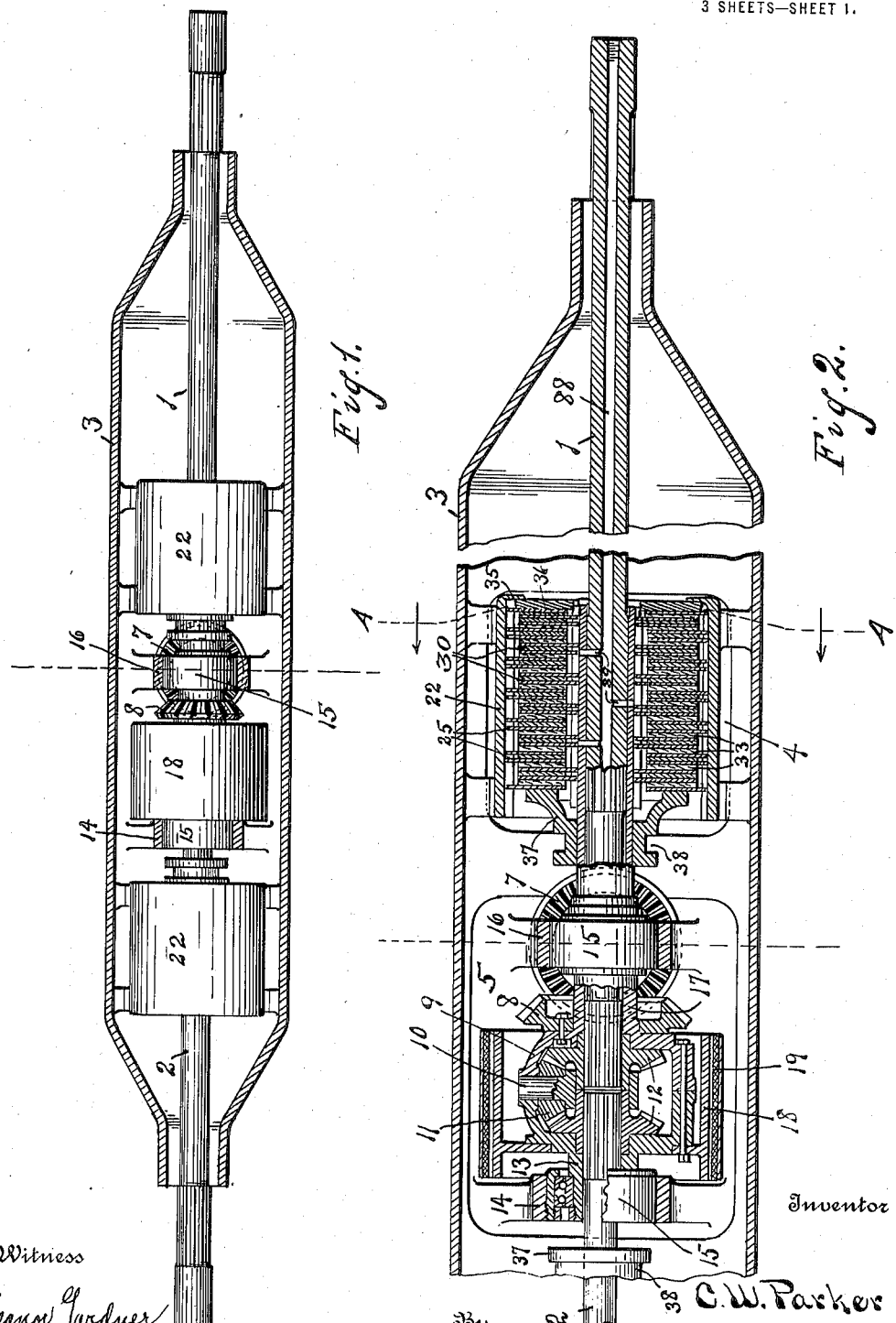

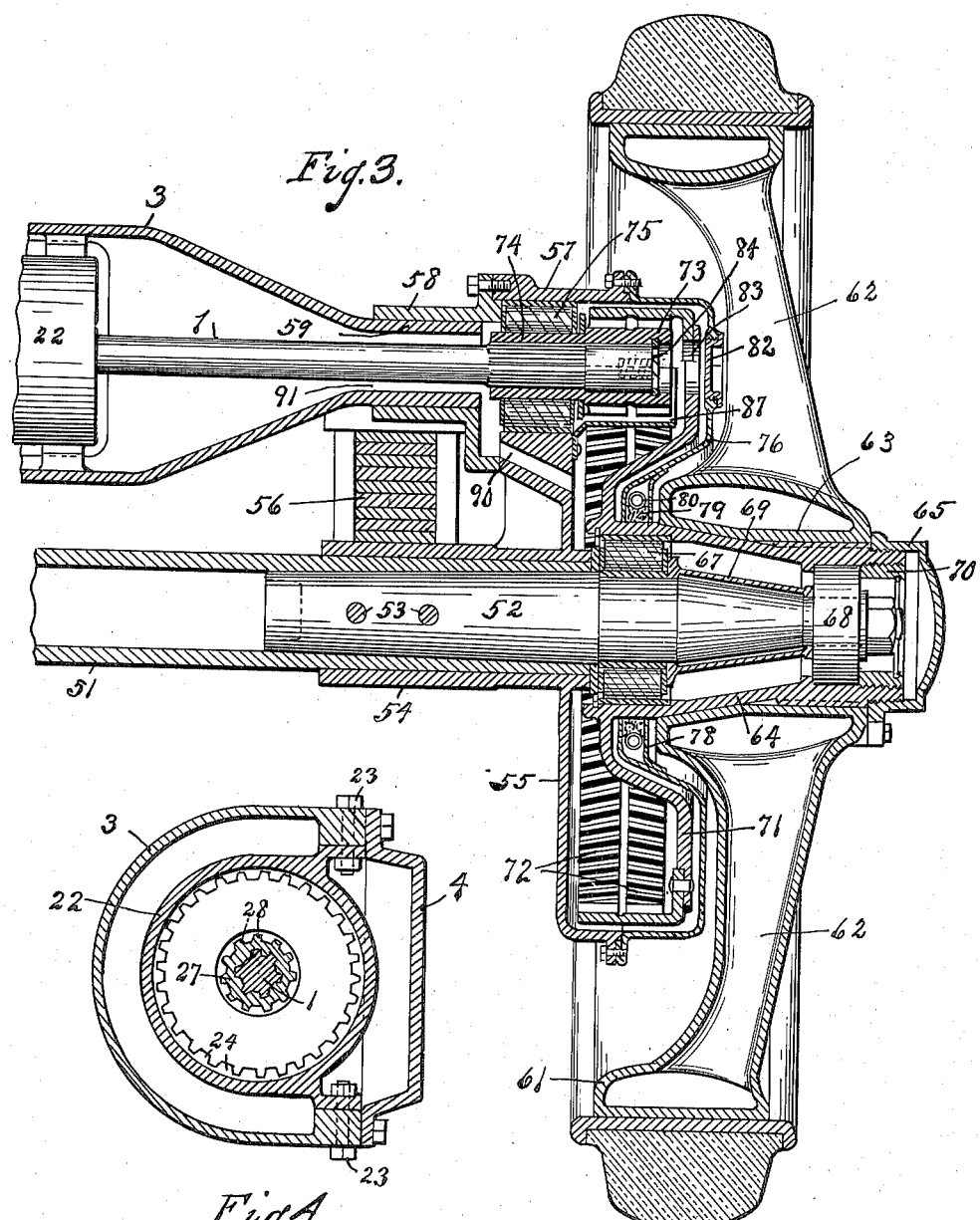

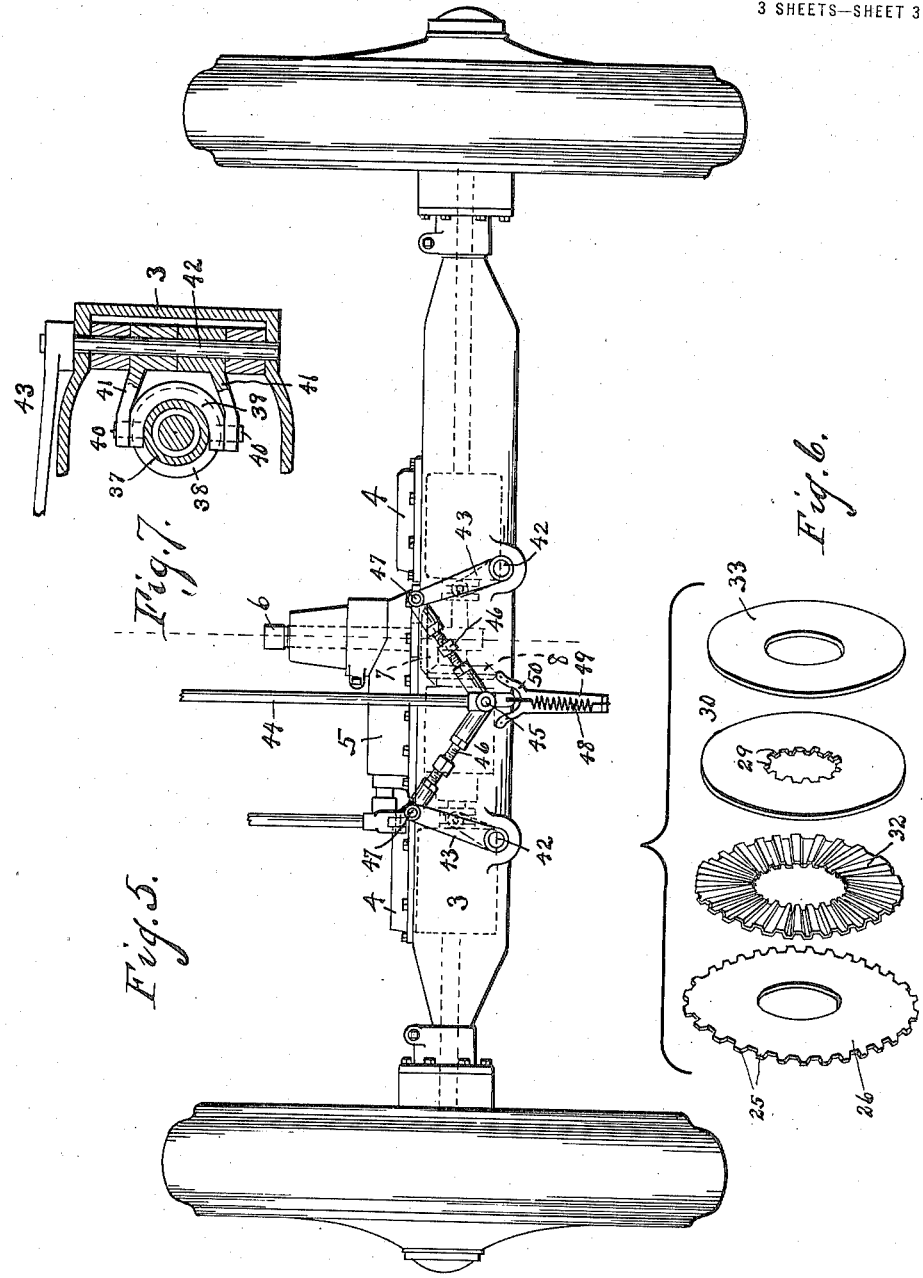

CLARK W. PARKER, OF NEW YORK, N. Y.

BRAKE MECHANISM.

1,315,236.    Specification of Letters Patent.    Patented Sept. 9, 1919.

Application filed December 26, 1918. Serial No. 268,240.

*To all whom it may concern:*

Be it known that I, CLARK W. PARKER, a citizen of the United States, and residing at New York, in the county of New York and State of New York, have invented a new and Improved Brake Mechanism, of which the following is a specification.

This invention relates to brakes for motor vehicles, especially for two part driving members such as two part axles and two part driving shafts for tractor wheels of motor vehicles, and its object is to provide a multiple-disk brake mechanism which shall be simple in construction, powerful in action, and which shall be fully inclosed and protected from dust.

This invention consists, in combination with the differential of a motor vehicle, of a pair of shafts connected to said differential and driven thereby, of a pair of multiple-disk brake mechanisms, one on each shaft on each side of the differential, and means for simultaneously operating said brake mechanisms.

It further consists in an axle structure and a tractor wheel on each end thereof, and gearing between the shafts and the wheels, said wheels being formed with oil receptacles inclosing the gearing, and said shafts being formed with longitudinal passages to permit the flow of oil from the tractor wheels to the brake mechanisms.

It also consists in the details of construction illustrated in the accompanying drawings and particularly pointed out in the claims.

In the accompanying drawings Figure 1 is a vertical section of a shaft casing and a vertical elevation of a two-part driving shaft. Fig. 2 is a vertical section of the differential and one of the brake mechanisms shown in Fig. 1. Fig. 3 is a vertical section of a tractor wheel. Fig. 4 is a section on the line 4—4 of Fig 2. Fig. 5 is a plan of a rear axle structure. Fig. 6 is a perspective view of brake disks used in this rear axle structure. Fig. 7 is a vertical section through a brake actuating shaft.

Similar reference characters refer to like parts throughout the several views.

As shown in Figs. 1 and 2, this brake mechanism is adapted for any two alined shafts which are connected and driven by means of the equivalent of a differential mechanism and these two shafts may be the two parts of a driving axle or may be the two parts of a transverse shaft employed for driving the tractor wheels of a motor vehicle.

The structure shown in Figs. 1, 2, 5 and 6 comprises a shaft formed of the alined parts 1 and 2 and a casing 3 inclosing same. Secured to the casing, as shown in Fig. 5, are the caps 4 and 5, the caps 4 each supporting a brake mechanism and the cap 5 supporting a shaft 6 by means of which the two parts 1 and 2 of the shaft first mentioned may be driven. A gear 7 on the rear end of the longitudinal shaft 6 meshes with a gear 8 on the cage 9 of the differential mechanism. The pin 10 carried by this cage supports a pinion 11 which meshes with the bevel gears 12 which are splined on the adjacent ends of the shafts 1 and 2. The cage 9 has a hub 13 which is mounted in a supporting ring 14, a bearing 15 of any desired character being provided, and this ring 14 is carried by the cap 5. This cap 5 also carries a second ring 16 which supports the bearing 15 for the second hub 17 of the differential cage. On this differential cage is a drum 18 which may be engaged by an emergency brake band 19 of any desired character and this brake band may be operated by any well known type of mechanism. The differential and its mounting thus far described are similar to that shown in my former application Serial No. 256,790, dated October 4, 1918, and has been shown merely as an example of driving mechanism for two part shafts, and any other desired type of differential or any other driving mechanism may be substituted therefor.

When the cap 4 on either side of the differential is removed and the shaft at that side of the differential is slid out longitudinally, the cylinder 22 on either side of the brake mechanism may be removed. Each of these cylinders may be secured in place in any desired manner, the bolts 23 being shown in Fig. 4. This cylinder 22 has internal teeth 24 which mesh with the external teeth 25 on the disks 26, one of them being shown in detail in Fig. 6. As shown in Figs. 2 and 4, the circumference of the shafts 1 and 2 is provided with longitudinal splines or ribs which mesh with proper grooves in sleeves 27. These sleeves are also provided with longitudinal ribs or splines 28 which mesh with the internal teeth 29 in the disks 30, which are shown in detail in Fig. 6. The disks 26 will be in pairs and in between each pair may be placed a corrugated disk 32, such as shown in Fig. 6, made of such stiff material, preferably sheet steel, that they will not reduce in width under ordinary pressures, and each pair of disks 26 with a corrugated disk 32 between them will substantially constitute a single brake disk having many radial passages, the object being to permit free flow of lubricating oil radially of the brake mechanism.

In a similar manner the brake disks 30 which are caused to turn with the sleeve 27 and the shaft 1 may also be in pairs and spaced by means of disks 32 so that they also are substantially solid with radial passages. The disks or rings 33, also shown in Fig. 6, are preferably of fiber and will be placed between adjacent disks 26 and 30 so that when these disks 26 and 30 are pressed toward each other and turned relative to each other there will be considerable friction between them. It will be understood that any other kind of disks may be employed.

Referring now to Fig. 2, it will be noticed that the cylindrical case 22 has a flange 35 at its outer end that supports a ring 36, against which one of the brake disks is pressed. Slidable on the sleeve 27 and freely revoluble thereon is a collar 37 having a circumferential groove 38 which is adapted (Fig. 7) to receive a shoe 39 supported by pins 40 carried by the outer ends of the arms 41, which arms are secured to a small shaft 42. On the upper outer end of each shaft 42 is secured a crank arm 43. Movable longitudinally of the vehicle (Fig. 5) by any desired mechanism is a rod 44, the outer end of which carries a pin 45 on which the adjacent ends of two adjustable links 46 of any desired construction are mounted. The outer ends of these links connect to the pins 47 mounted on the ends of the crank arms 43. A spring 48 connects to the outer end of a bracket 49 and to the pin 45 and normally holds the rod 44 in its rearward position, the rearward limit of movement of this rod 44 being determined by means of a fork 50 carried by the bracket 49. It will be noticed that this spring 48 holds the collars 37 toward each other and normally relieves the brake mechanisms of all pressures, but that when this rod 44 is moved forward, the arms 43 will be swung outwardly, and the collars 37 will press the disks 26, 30 and 33 together. As the disks 26 are prevented from turning by means of the cylinders 22 and as the disks 30 turn with the sleeves 27 and shafts 1 and 2, a braking action will be obtained.

Referring now to Fig. 3, 51 is a tube extending across the vehicle and having stub axles 52 secured in its ends by means of the pins 53. Mounted on each end of the tube 51 is a sleeve 54 and a web 55, and mounted on the sleeve 54 are springs 56 which support the vehicle. The web 55 is formed with an extension 57 to which a thimble 58 is secured and into this thimble 58 the reduced end 59 of the casing 3 extends. The wheel shown in Fig. 3 is composed of a felly 61, spokes 62 and sleeve-like center 63, which is formed to fit the hub 64, both hub and wheel center 63 being preferably provided with splines which inter-engage, and the wheel being held on the hub by means of the hub cap 65. The hub is journaled on the stub axle 52, bearings 67 and 68 being provided, the two bearings being positioned by means of the tapering spacer 69 and held in position by means of the threaded bushing 70.

Connected to this hub is a web 71 which has secured to its outer edge a double ring of teeth 72 which mesh with the pinion 73 on the outer end of the shaft 1. The pinion 73 is preferably formed with a hub 74 which is grooved to receive the splines on the outer end of this shaft 1 and is carried in the bearing 75. An annulus 76 is secured at its outer edge to the outer edge of the web 55 to constitute an oil receptacle, leakage being prevented by means of a ring 78 which holds in position the packing 79, which packing is pressed against the hub by means of a coil spring 80. A plug 82 in alinement with the shaft 1 may be removed to permit a proper tool to be inserted through the opening 83 in the web 71.

When this opening 83 has been brought into alinement with the shaft 1, and after a small locking ring 84 has been removed, the shaft 1 may be pulled out longitudinally. It will be noticed that the splines at the end of the shaft which engage with the hub 74 of the pinion 73 are slightly larger than the splines which receive the sleeve 27, and these splines in turn are slightly larger than the splines at the inner end of the shaft which engage within the proper gear 12. After the shaft has been withdrawn, the cap 4 can be removed, and the bolts 23 taken out, after which the brake on that side of the central bearing 15 may be taken out through the opening in the front of the case 3. This brake mechanism is substantially self contained, the cylinder 22 being secured directly to the casing 3, the disks 25 being supported by this cylinder 22 and the disks 30 being supported by the sleeve 27. This sleeve can be easily positioned in order to receive the inner end of the shaft 1 when that is pushed into place.

Secured to the web 55 is a semi-cylindrical plate 87 which causes the oil in the receptacle (formed by the web 55 and the annulus 76), when thrown out by centrifugal force caused by the gear ring, to collect around the pinion 73 and at the end of the shaft 1. The pressure exerted by the centrifugal force causes the oil to flow toward the differential through the longitudinal hole 88 in the shaft 1 until it reaches the small radial holes 89 shown in Fig. 2 and thus reaches the interior of the brake disks. The oil will fill the casing 3 up to the top of the passage 90—91 shown in Fig. 3 and the excess will flow back into the oil receptacle in the wheel.

The angular relation of the case 3 to the central line of the wheels and to the horizontal plane may be changed as desired, and if the connections between the case 3 and the stub axles 52 are made sufficiently strong, the tube 51 may be entirely omitted.

Various modifications in the details and proportions of the various parts may be made by those skilled in the art without departing from the spirit of my invention as set forth in the following claims.

I claim:

1. In a driving mechanism for motor vehicles, the combination of two alined shafts, a gear mechanism connecting the adjacent ends of the shafts, tractor wheels connected to the outer ends of the shafts, a series of brake disks rotatable with but slidable on each of said shafts intermediate its ends, a series of non-rotatable brake disks positioned alternately with the rotatable disks, and toggle mechanism mounted between the two brake mechanisms for pressing the disks of each group together.

2. In a driving mechanism for motor vehicles, the combination of two alined shafts, a gear mechanism connecting the adjacent ends of the shafts, tractor wheels connected to the outer ends of the shafts, a series of brake disks rotatable with but slidable on each of said shafts, a series of non-rotatable brake disks positioned alternately with the rotatable disks, a casing for said shafts, a collar slidable on each shaft and adapted to press the disks of each group together, and means to force the collars against said brake disks.

3. In a driving mechanism for motor vehicles, the combination of two alined shafts, a gear mechanism connecting the adjacent ends of the shafts, tractor wheels connected to the outer ends of the shafts, a series of brake disks rotatable with but slidable on each of said shafts, a series of non-rotatable brake disks positioned alternately with the rotatable disks, a casing for said shafts, a collar slidable on each shaft adjacent the driving mechanism therefor, and a toggle mechanism for actuating said collars to cause pressure between the brake disks of each group.

4. In a driving mechanism for motor vehicles, the combination of two alined shafts, a gear mechanism connecting the adjacent ends of the shafts, a brake mechanism mounted on each shaft, a tractor wheel at the outer end of one of the shafts and eccentric thereto, a ring of internal gear teeth secured to said wheel, a pinion on the shaft engaging the internal teeth, and an oil receptacle extending around the gear ring and pinion, said shaft having a longitudinal passage to convey oil from said oil receptacle to the brake mechanism and with radial passages connecting with the longitudinal passage at the brake mechanism.

5. In a driving mechanism for motor vehicles, the combination of two alined shafts, a gear mechanism connecting the adjacent ends thereof, stub axles at the outer ends of said shafts and spaced therefrom, tractor wheels mounted on the stub axles, gears connecting the wheels and shafts, an annular oil receptacle mounted co-axially with each wheel, the ends of the shafts extending into said oil receptacles, a multiple-disk brake mechanism mounted on each shaft, said shafts having oil passages extending from their outer ends to said brake mechanisms, and means to operate said brakes.

6. In a driving mechanism for motor vehicles, the combination of two alined shafts, a gear mechanism connecting the adjacent ends of the shafts, a group of brake disks mounted on each shaft, a casing for the shafts, alternate disks being slidably connected to the shafts to rotate therewith and the other disks being slidably connected to the casing, means to engage an end disk of each group to limit its movement, means including levers to transmit pressure to the disks at the opposite ends of the groups, and means connected to the levers of both groups to actuate the same simultaneously.

7. In a driving mechanism for motor vehicles, the combination of two alined shafts and driving gear mechanism connecting the adjacent ends thereof, a casing for the shafts, a disk-brake mechanism mounted on each shaft within the casing, a pair of levers to actuate each brake mechanism, one of the levers of each pair being without the casing, an adjustable link connected to each outer lever, a rod connecting said links, and a spring connected to said rod to normally restrain the levers from actuating the brakes.

8. In a driving mechanism, the combination of a shaft having longitudinal splines, a tube fitting said splines and also provided with longitudinal splines on its outer surface, a series of friction disks slidable on said tube and fitting said splines, a cylindrical shell surrounding said shaft and tube and formed with longitudinal interior splines, a second series of friction disks mounted within the shell and fitting the splines thereof, and positioned alternately with the first named disks, free friction disks between the disks of said two series, and means to press the disks together.

CLARK W. PARKER.